United States Patent Office

3,316,279
PREPARATION OF OLEFIN OXIDES
Donald M. Fenton, Anaheim, Calif., assignor to Union Oil Company of California, Los Angeles, Calif., a corporation of California
No Drawing. Filed Aug. 3, 1964, Ser. No. 387,178
18 Claims. (Cl. 260—348.5)

This invention relates to a process for the production of olefin oxides; and in particular, relates to the production of olefin oxides by liquid phase oxidation of hydrocarbon olefins in the presence of rhenium compounds and oxidation modifiers that increase the production of olefin oxides during the oxidation reaction. This is a continuation-in-part of my co-pending application Ser. No. 373,878, filed June 9, 1964.

I have discovered that hydrocarbon olefins can be oxidized to valuable epoxides at an attractively high yield in the presence of rhenium compounds, i.e., wherein the rhenium has a positive oxidation state, and oxidation modifiers, under relatively mild conditions. When the oxidation modifier is not present in the reaction medium, the oxidation reaction products are mainly acids, esters, ketones, aldehydes, and ethers.

In its simplest embodiment, my invention comprises oxidizing hydrocarbon olefins by contacting said olefins with a rhenium compound in a liquid reaction medium containing an oxidation modifier at a temperature of $-50°$ to $300°$ C. and at sufficient pressure to maintain the reaction medium as a liquid. During the oxidation, the rhenium compound is reduced to a lower valency and a modification of my invention comprises regeneration of the reduced rhenium compound by conducting the oxidation process in the presence of oxygen.

Oxidation modifiers that are suitable for use in my invention are alkyl, aryl and cycloalkyl cyanides, and heterocyclic amines such as the pyridines and quinolines having from 2 to about 14 carbon atoms. Examples of such compounds are alkyl cyanides such as methyl cyanide, ethyl cyanide, iso-propyl cyanide, hexyl cyanide, nonyl cyanide, 3-cyanopentane, 2-cyanoheptane, etc.; aryl cyanides such as phenyl cyanide, tolyl cyanide, xylyl cyanide, cumenyl cyanide, $\beta$-cyanonaphthalene, $\alpha$-cyanonaphthalene, etc.; cycloalkyl cyanides such as cyclohexyl cyanide, 4-methylcyclohexyl cyanide, cyclopentyl cyanide, 3-methylcyclopentyl cyanide, etc.; pyridines such as 4-methylpyridine, 3-methylpyridine, pyridine, 2,3-dimethylpyridine, 3,5-dimethylpyridine, 2-ethylpyridine, 4-methyl-2-ethylpyridine, 2-methyl-6-ethylpyridine, 1-propylpyridine, 2,3,6-trimethylpyridine, 1,2,3,4-tetramethylpyridine, 2-butylpyridine, etc.; quinolines such as quinoline, iso-quinoline, 3-methylquinoline, 4-methylquinoline, 6-methylquinoline, 2-ethylquinoline, 4-ethylquinoline, 2,3-dimethylquinoline, 2,8-dimethylquinoline, 4,7-dimethylquinoline, 5,8-dimethylquinoline, 2,4,8-trimethylquinoline, 2,3,8-trimethylquinoline, etc.

While normally gaseous modifiers can be used in my process, I prefer to use modifiers that are liquid at reaction conditions. The modifier should be present in amounts from about 0.05 to 15 weight percent and preferably, from about 0.1 to 5 weight percent of the reaction medium.

When the reaction takes place in the presence of an oxidation modifier, according to my invention, the product of reaction is mainly an epoxide whereas the epoxide undergoes further reaction when the oxidation is performed out of the presence of a modifier. Products from the further reaction include condensation products formed when the epoxide dimerizes to the substituted dioxane or polymerizes to the polyether and $\alpha$-hydroxycarbonyl compounds from further oxidation of the epoxide.

Hydrocarbon olefins that can be oxidized in accordance with the method of my invention are branched or straight chain unsaturated acyclic or cyclic olefins having one or more double bonds. Olefins having an aryl substituent such as phenyl, tolyl, etc. can also be oxidized. Low molecular weight olefins that are gaseous at ambient temperature and pressure such as ethylene, propylene, 1-butene, 2-butene, etc., can be oxidized with the method of my invention as well as hydrocarbon olefins that are normally liquid at such conditions, such as n-pentene, 2-propylhexene-1, cyclohexene, heptene, 4,4-dimethylnonene-1, cyclooctene, octene, cyclononene, 1-nonene, iso-decylene, cycloundecene, dodecene, 1-tetradecene, 4-propyldecene-1, heptadecene, 4-hexadecene, iso-octadecene, docosene, tetracosene, hexacosene, octacosene, tetracontene, etc. Examples of substituted olefins are vinyl aromatics such as styrene, $\alpha$-methylstyrene, p-methylstyrene, p-vinylcumene, $\alpha$-vinylnaphthalene, 1,2-diphenylethylene, allyl benzene, o-vinyl-p-xylene, divinylbenzene, 1-allyl-4-vinylbenzene, 1,5-heptadiene, 2,5-decadiene, etc. In general, olefins containing from 2 to 30 carbon atoms can be oxidized by my method with the most preferred range being from 2 to 20 carbon atoms. Relatively pure olefins can be oxidized to simplify the product recovery steps; however, it is also within the scope of my invention to oxidize olefin mixtures such as mixtures of normally gaseous hydrocarbon, normally liquid hydrocarbons, or normally gaseous and normally liquid hydrocarbons.

Rhenium compounds that are suitable for use in my invention are rhenium oxides such as rhenium trioxide, rhenium heptoxide, rhenium sesquioxide, etc.; alkali metal, alkaline earth metal, and ammonia perrhenates such as sodium perrhenate, potassium perrhenate, calcium perrhenate, ammonia perrhenate, etc.; rhenium halides such as rhenium trichloride, rhenium tetrachloride, rhenium hexachloride, rhenium tetrafluoride, rhenium hexafluoride, etc.; rhenium oxyhalides such as rhenium trioxybromide, rhenium oxytetrachloride, rhenium trioxychloride, rhenium oxytetrafluoride, rhenium dioxydifluoride, etc. Preferably rhenium compounds are used which are soluble in the particular reaction medium, hereafter described.

When rhenium oxides are used as the rhenium compound, the oxidation can be performed under substantially anhydrous conditions and this is preferred. Water can be present; however, and, in particular when using the other indicated rhenium compounds, water in amounts from about 1 to 50 weight percent; preferably from about 5 to 25 weight percent of the reaction medium can be used. Preferably such aqueous reaction medium is acidified with any suitable acid, e.g., a strong mineral acid such as nitric, sulfuric or hydrochloric, to lower the liquid pH to about 1 to 6.5.

During the oxidation of the olefins, the rhenium compound is reduced to a lower valency and must be regenerated by oxidation so it can be used again in the oxidation of olefins. This regeneration can be performed in a separate step by removing the olefin and oxidized product from all or a portion of the reaction medium which contains the reduced state of rhenium and thereafter oxidizing the rhenium by contacting the reaction medium with oxygen. In situ regeneration can also be used by introducing oxygen into the reaction zone during the oxidation of the olefin. In either event, the regeneration can be achieved at a suitable rate at temperatures from about $125–300°$ C.; preferably from $150–200°$ C. Pressures from 1 atmosphere to about 250 atmospheres and preferably, pressures from about 200 to 2,000 p.s.i. can be used.

The oxidation of the olefin is performed in a liquid phase. When higher olefins are oxidized, i.e., those that re in a liquid state under the oxidation conditions, the olefin can conveniently be used in excess thereby serving as a reaction medium. When normally gaseous olefins such as propylene and ethylene are oxidized, an organic liquid can be used which is a solvent for the normally gaseous olefins and the rhenium compound. In general, any organic compound that is a liquid and which is inert under oxidation conditions and chemically non-reactive with the olefin and the olefin oxidation product at the reaction conditions can be used. Preferably an organic liquid which has a solubility for the olefin and rhenium is used. Examples of suitable solvents are: aromatic hydrocarbons such as benzene, toluene, xylene, etc.; aliphatic hydrocarbons such as hexane, heptane, iso-octane, nonane, decane, cyclohexane, methyl cyclohexane, etc.; halogenated hydrocarbons such as chlorobenzene, bromobenzene, carbon tetrachloride, n-butylbromide, iso-amylbromide, iso-amylchloride, trichloropropane, pentachloroethane, ethylchloride, ethylbromide, iso-butylchloride, etc.; esters such as methyl acetate, ethyl acetate, dimethyl phthalate, ethyl propionate, n-propyl acetate, n-butyl formate, sec-butyl acetate, iso-butyl acetate, ethyl butylrate, iso-amyl acetate, cyclohexyl acetate, etc.; and amides such as N,N-methyl formamide, N,N-dimethyl acetamide, formamide, etc.

The olefin oxidation can be performed in accordance with my invention in a discontinuous batch or in a continuous process at the aforementioned temperature and pressure conditions. In the discontinuous process, the olefin is introduced into a reaction vessel to contact the liquid reaction medium containing the rhenium compound and the oxidation modifier. The introduction of the olefin is continued until further olefin absorption or heat release ceases indicating that the rhenium compound has been substantially reduced to an inactive state. The oxidation product can then be removed by distillation or stripping it from the vessel and oxygen can then be introduced into the reaction vessel to re-oxidize the reduced rhenium catalyst. As in the case of olefin oxidation, complete regeneration is indicated by lack of further oxygen absorption or heat release. In these discontinuous processes, the olefin oxidation can be conducted in the reaction vessel at low temperatures, i.e., from about $-50°$ to $125°$ C. and most preferably from about $-25°$ to $50°$ C. When the reaction is conducted at such temperatures, the yield of olefin oxides is increased. Since the oxidation modifiers do not act as reactants during the reaction, they can be separated from the oxidation products by any well known separation method such as distillation and used again in subsequent oxidation reactions.

In the continuous method, the olefin and oxygen can also be admixed with an inert gas such as nitrogen, argon, carbon dioxide, etc., or air or mixtures of air and oxygen. It is preferred, when using a continuous method, to operate at temperatures from about $125°$ to $300°$ C. so that regeneration of the reduced rhenium species will take place in the reaction vessel without changing the physical conditions of the system. As oxygen is introduced into the reaction vessel, the reactants are stirred or mixed to insure complete oxygen contact with the olefins in said vessel. Preferably, the reaction vessel is cooled to remove the exothermic heat release from the oxidation. The oxidation products can be continually removed from the reaction vessel with a portion of the liquid reaction medium and the oxidation modifier. The reaction products can then be separated therefrom by distillation or other well known separation methods and the reaction medium and modifier can be recycled to the reaction vessel. The product from the oxidation reaction is mainly the oxide of the hydrocarbon olefin reactant.

The following examples will illustrate the mode of practice of my invention and demonstrate the results obtainable thereby. All parts expressed herein are on a weight basis.

*Example I*

In a first experiment, a 300 milliliter autoclave was charged with 15 parts rhenium heptoxide, 50 parts 2-butene, and 1 part pyridine. The autoclave was heated to $100°$ C. and maintained at this temperature for 2 hours. The crude product of reaction was then purified by distillation to obtain the following products:

| | Parts |
|---|---|
| 2,3-butylene oxide | 3 |
| Methyl ethyl ketone | 1 |

The experiment was repeated; however, the pyridine was omitted. The following products were obtained:

| | Parts |
|---|---|
| 2,3-butylene oxide | 1 |
| Methyl ethyl ketone | 3 |

*Example II*

In a third experiment, a two-liter autoclave was charged with 250 parts propylene, 400 parts benzene and 10 parts rhenium heptoxide. The autoclave was heated to $170°$ C. and then pressurized to 800 p.s.i.g. by the addition of nitrogen. Oxygen was then added to the autoclave in ten increments of 20 p.s.i. keeping the pressure at about 800 p.s.i.g. During the oxygen injection period, the oxidation reactants were continually stirred. A total of 0.8 gram of propylene oxide were produced.

The experiment was repeated in the experiments listed in the following table; however, varied amounts of pyridine were added to the autoclave in successive experiments. The percent pyridine used in the experiments is based on the weight percent of pyridine in the reaction medium, i.e., benzene and pyridine.

TABLE

| Experiment No. | Pyridine (wt. percent) | Propylene Oxide (grams) |
|---|---|---|
| Experiment 4 | 0.1 | 2.0 |
| Experiment 5 | 0.3 | 3.4 |
| Experiment 6 | 0.7 | 3.6 |
| Experiment 7 | 1.4 | 2.0 |
| Experiment 8 | 2.8 | 1.2 |

The preceding examples indicate that the addition of small quantities of pyridine to the reaction medium can result in more than a three-fold increase in the production of propylene oxide.

The preceding examples are intended solely to illustrate the practice of my invention and to demonstrate the results secured thereby. These examples are not intended to unduly limit the invention which is intended to be defined only by the steps and reagents, and their obvious equivalents, set forth in the following claims.

I claim:

1. The oxidation of hydrocarbon olefins to olefin oxides which comprises contacting hydrocarbon olefins having 2 to about 30 carbon atoms with a rhenium compound selected from the group consisting of rhenium oxide, alkali metal, alkaline earth metal and ammonium perrhenates and mixtures thereof in a liquid reaction medium inert to the oxidation and containing 0.05 to about 15 weight percent of a reaction modifier selected from the group consisting of alkyl, aryl and cycloalkyl cyanides, pyridines, and quinolines having from 2 to about 14 carbon atoms, at a temperature of $-50°$ to $300°$ C. and at a pressure from 1 to about 250 atmospheres, sufficient to maintain said medium as a liquid.

2. The method of claim 1 wherein the rhenium compound is rhenium heptoxide.

3. The method of claim 1 wherein the reaction modifier is pyridine.

4. The method of claim 3 wherein the pyridine is present in amounts from 0.1 to 5 weight percent of the liquid reaction medium.

5. The method of claim 4 wherein the olefin is propylene.

6. The process of claim 4 wherein the reaction medium is benzene.

7. A method for the oxidation of hydrocarbon olefins to olefin oxides which comprises contacting hydrocarbon olefins having 2 to about 30 carbon atoms with oxygen and rhenium oxide in a liquid reaction medium, inert to the oxidation, which contains 0.05 to about 15 weight percent of a reaction modifier selected from the group consisting of alkyl, aryl and cycloalkyl cyanides, pyridines, and quinolines having less than 14 carbon atoms, at a temperature of 125° to 300° C. and at a pressure from 1 to about 250 atmospheres, sufficient to maintain said medium as a liquid.

8. The process of claim 7 wherein the olefin is propylene.

9. The process of claim 8 wherein the modifier is pyridine.

10. The process of claim 9 wherein the rhenium oxide is rhenium heptoxide.

11. A method for the production of olefin oxides which comprises contacting hydrocarbon olefins having 2 to 30 carbon atoms with water and a perrhenate selected from the group consisting of alkali metal, alkaline earth metal and ammonium perrhenates and mixtures thereof in a liquid reaction medium, inert to the oxidation and containing 0.05 to about 15 weight percent of a reaction modifier selected from the group consisting of alkyl, aryl and cycloalkyl cyanides, pyridines and quinolines having less than 14 carbon atoms, at a temperature of −50° to 300° C. and at a pressure from 1 to about 250 atmospheres, sufficient to maintain said medium as a liquid.

12. The process of claim 11 wherein the olefin is propylene.

13. The process of claim 12 wherein the modifier is pyridine and is present in amounts from 0.1 to 5 weight percent.

14. The process of claim 13 wherein the reaction medium is benzene.

15. A method for the production of olefin oxides which comprises contacting a hydrocarbon olefin having 2 to 30 carbon atoms with oxygen, water, and a perrhenate selected from the group consisting of alkali metal, alkaline earth metal and ammonium perrhenates and mixtures thereof in a liquid reaction medium inert to the oxidation which contains 0.05 to about 15 weight percent of a reaction modifier selected from the group consisting of alkyl, aryl, and cycloalkyl cyanides, pyridines and quinolines, having less than 14 carbon atoms at a temperature of 125° to 300° C. and at a pressure from 1 to about 250 atmospheres, sufficient to maintain said medium as a liquid.

16. The method of claim 15 wherein the modifier is pyridine and is present in amounts from 0.1 to 5 weight percent.

17. The method of claim 16 wherein the olefin is propylene.

18. The method of claim 17 wherein the reaction medium is benzene.

No references cited.

WALTER A. MODANCE, *Primary Examiner.*

NORMA S. MILESTONE, *Assistant Examiner.*